(No Model.)

C. A. TOWER.
WHEEL.

No. 558,327.        Patented Apr. 14, 1896.

WITNESSES        INVENTOR

United States Patent Office.

CLINTON A. TOWER, OF CLEVELAND, OHIO, ASSIGNOR TO THE NATIONAL MALLEABLE CASTINGS COMPANY, OF SAME PLACE.

WHEEL.

SPECIFICATION forming part of Letters Patent No. 558,327, dated April 14, 1896.

Application filed February 6, 1896. Serial No. 578,185. (No model.)

*To all whom it may concern:*

Be it known that I, CLINTON A. TOWER, of Cleveland, in the county of Cuyahoga and State of Ohio, have invented a new and useful Improvement in Wheels, of which the following is a full, clear, and exact description, reference being had to the accompanying drawings, forming part of this specification, in which—

Figure 1:
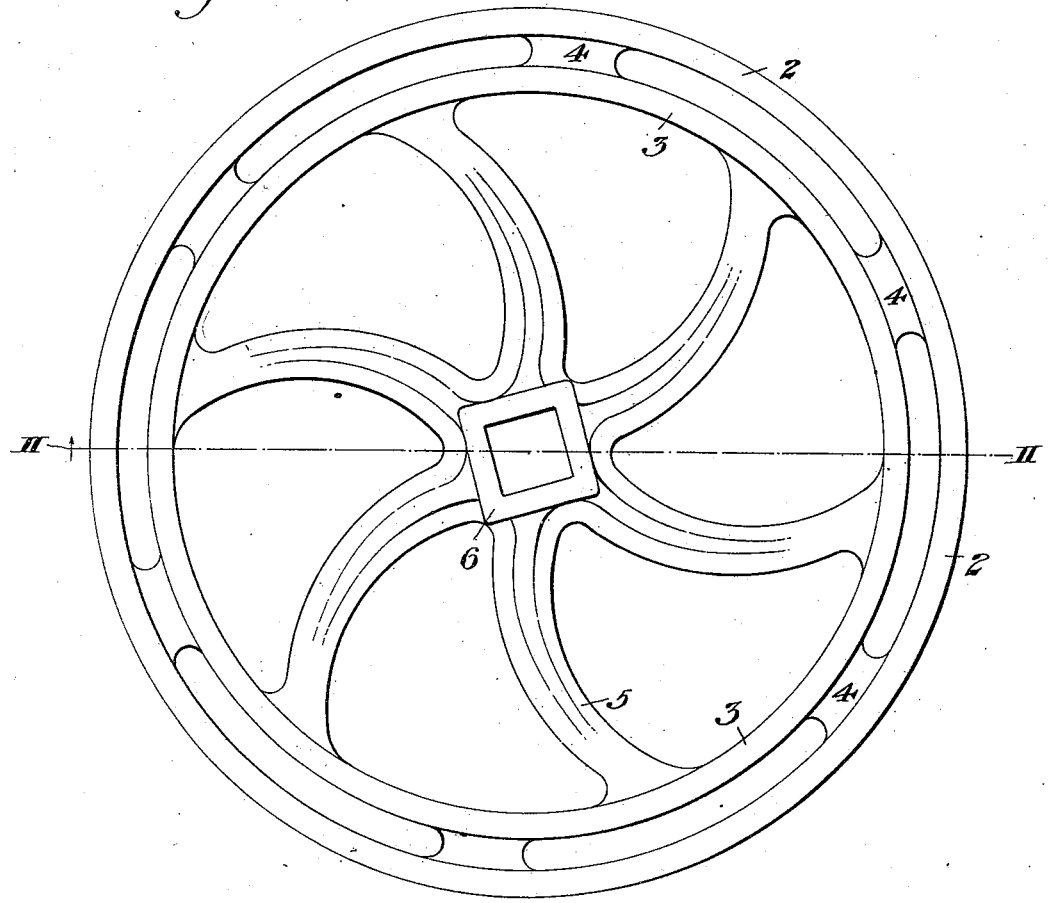
Figure 2:
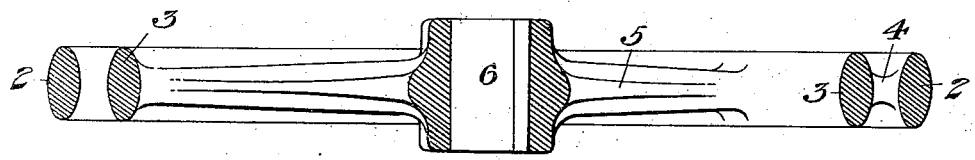

Figure 1 shows one of my improved hand brake-wheels in plan view, and Fig. 2 is a transverse vertical section on the line II II of Fig. 1.

The object of my invention is to provide a wheel adapted for use as the hand-wheel of car-brakes and for other purposes, such as wheels for hand-cars, street-cars, or wheelbarrows, which shall be stronger and lighter than ordinary cast-iron wheels having solid rims, and which is of such construction that it can be cast readily and economically of malleable iron without danger of cracking by reason of the contraction which takes place when the casting cools, notwithstanding the hard and brittle nature of unannealed malleable cast-iron. I effect these desirable results by constructing the wheel with two distinct concentric rims, the spokes of the wheel being integral with the inner rim, and I connect these rims by short intervening webs or connecting-spokes so spaced relatively to the main spokes that they shall be between the outer ends of the latter and not directly opposite thereto. This construction affords considerable elasticity to the rims, so that when the wheel is cast such elasticity shall act to prevent the cracking of the main spokes when they contract in cooling. It is not necessary that the main spokes shall be curved as shown, and modifications in the form and construction of the wheel may be made by the skilled mechanic without departure from my invention.

In the drawings, 2 is the outer rim of the wheel; 3, the inner concentric rim; 4 4, the intervening connecting-webs made integral with both rims, and 5 5 are the main spokes, which radiate from the central hub 6 and at their ends connect with the inner rim at points between the webs. The spokes, rims, and connecting-webs constitute an integral casting. In casting the wheel no cores need be used to produce the open space between the rims.

I claim—

A wheel having main spokes, and two concentric rims, to the inner one of which the main spokes are integrally cast, said rims being connected at intervals by integral webs situate respectively between the ends of the main spokes and not directly opposite thereto; substantially as described.

In testimony whereof I have hereunto set my hand.

CLINTON A. TOWER.

Witnesses:
S. L. SMITH,
LOREN B. WILSON.